US009509496B2

(12) United States Patent
Kawamura et al.

(10) Patent No.: US 9,509,496 B2
(45) Date of Patent: Nov. 29, 2016

(54) ELECTRONIC KEY REGISTRATION SYSTEM

(71) Applicant: KABUSHIKI KAISHA TOKAI RIKA DENKI SEISAKUSHO, Aichi (JP)

(72) Inventors: Daisuke Kawamura, Aichi (JP); Yuki Nawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 297 days.

(21) Appl. No.: 14/044,347

(22) Filed: Oct. 2, 2013

(65) Prior Publication Data

US 2014/0098959 A1    Apr. 10, 2014

(30) Foreign Application Priority Data

Oct. 10, 2012 (JP) ................................. 2012-225168

(51) Int. Cl.
*H04L 9/08* (2006.01)
*G07C 9/00* (2006.01)
*B60R 25/24* (2013.01)

(52) U.S. Cl.
CPC ............. *H04L 9/0816* (2013.01); *B60R 25/24* (2013.01); *G07C 9/00817* (2013.01); *G07C 9/00309* (2013.01); *G07C 9/00571* (2013.01); *G07C 9/00857* (2013.01); *G07C 2009/00841* (2013.01)

(58) Field of Classification Search
CPC . H04L 9/0869; H04L 9/3226; H04L 9/0816; H04L 9/3234; H04L 2209/84; B60R 25/24; B60R 25/241
See application file for complete search history.

(56) References Cited

U.S. PATENT DOCUMENTS

| 5,144,667 | A  |   | 9/1992  | Pogue, Jr. et al. |
| 5,708,712 | A  |   | 1/1998  | Brinkmeyer et al. |
| 5,838,251 | A  | * | 11/1998 | Brinkmeyer ............ B60R 25/04 307/10.2 |
| 6,067,028 | A  |   | 5/2000  | Takamatsu |
| 6,204,570 | B1 | * | 3/2001  | Muller .................... B60R 25/24 180/287 |
| 6,501,369 | B1 | * | 12/2002 | Treharne ................. B60R 25/24 307/10.5 |
| 6,683,391 | B1 | * | 1/2004  | Enoyoshi ................ B60R 25/04 307/10.2 |

(Continued)

FOREIGN PATENT DOCUMENTS

| CN | 1718983 | 1/2006 |
| DE | 4411450 | 3/1995 |

(Continued)

OTHER PUBLICATIONS

Search report from E.P.O., mail date is Jan. 22, 2014.

(Continued)

*Primary Examiner* — Tae Kim
(74) *Attorney, Agent, or Firm* — Greenblum & Bernstein, P.L.C.

(57) ABSTRACT

An electronic key registration system includes an electronic key device that stores a key ID and a first piece of information. A controller is arranged in a communication subject. A registration tool writes the key ID to the controller and stores a second piece of information. Encrypted communication between the communication subject and the electronic key device is enabled after the key ID and a corresponding encryption key are written to the controller. An information center, which communicates with the registration tool, receives and compares the first and second pieces of information. The registration tool is permitted to write the key ID when receiving a signal from the information center indicating that the first and second pieces of information conform to each other.

11 Claims, 4 Drawing Sheets

(56) References Cited

U.S. PATENT DOCUMENTS

| | | | | |
|---|---|---|---|---|
| 8,089,339 B2* | 1/2012 | Mikan | ............... | G07C 9/00309 235/384 |
| 8,237,554 B2* | 8/2012 | Miller | ................... | B60R 25/24 340/426.13 |
| 8,692,652 B2* | 4/2014 | Takeda | ................ | B60R 25/045 340/5.25 |
| 8,971,857 B2* | 3/2015 | Nishidai | .............. | H04W 12/06 340/426.17 |
| 8,977,408 B1* | 3/2015 | Cazanas | ............... | H04L 41/082 455/3.03 |
| 9,070,279 B2* | 6/2015 | Shimizu | ............... | H04L 9/3226 |
| 9,094,382 B2* | 7/2015 | Kawamura | ........... | H04L 9/0869 |
| 9,120,452 B2* | 9/2015 | Nishimoto | .......... | B60R 25/1001 |
| 2004/0200895 A1* | 10/2004 | Boyce | .................. | G06Q 20/32 235/380 |
| 2006/0006984 A1 | 1/2006 | Takahashi | | |
| 2006/0071753 A1* | 4/2006 | Lamar | ...................... | B25F 5/00 340/5.6 |
| 2006/0214766 A1* | 9/2006 | Ghabra | ............. | G07C 9/00309 340/5.25 |
| 2008/0059806 A1* | 3/2008 | Kishida | .................. | G06F 21/35 713/186 |
| 2009/0195407 A1* | 8/2009 | Nakano | ............... | H04N 5/4403 340/12.23 |
| 2009/0323967 A1* | 12/2009 | Peirce | .................. | H04L 9/0869 380/278 |
| 2012/0038453 A1* | 2/2012 | Bass | ...................... | E05B 19/00 340/5.6 |
| 2012/0164989 A1* | 6/2012 | Xiao | ...................... | G07C 5/008 455/414.1 |
| 2013/0285792 A1 | 10/2013 | Shimizu et al. | | |
| 2013/0301829 A1* | 11/2013 | Kawamura | ........... | H04L 9/0816 380/44 |
| 2013/0301834 A1 | 11/2013 | Kawamura et al. | | |
| 2013/0329890 A1 | 12/2013 | Kawamura et al. | | |
| 2013/0332736 A1* | 12/2013 | Kawamura | ........... | H04L 9/0869 713/171 |

FOREIGN PATENT DOCUMENTS

| | | |
|---|---|---|
| DE | 19721286 | 9/1998 |
| JP | 07-061328 | 3/1995 |
| JP | 2003-148018 | 5/2003 |
| JP | 2004-107959 | 4/2004 |
| JP | 2005-264625 | 9/2005 |
| JP | 2011-20475 | 2/2011 |

OTHER PUBLICATIONS

U.S. Appl. No. 14/058,710 to Daisuke Kawamura et al., which was filed on Oct. 21, 2013.

U.S. Appl. No. 13/930,758 to Kenichi Koga et al., which was filed on Jun. 28, 2013.

U.S. Appl. No. 14/043,081 to Daisuke Kawamura et al., which was filed on Oct. 1, 2013.

Office Action issued in Japan Patent Appl. No. 2012-225168, dated May 10, 2016, along with an English translation thereof.

Office Action issued in Chinese Patent Application No. 201310467277.0 dated Jun. 2, 2016.

* cited by examiner

ELECTRONIC KEY REGISTRATION SYSTEM

CROSS-REFERENCE TO RELATED APPLICATIONS

This application is based upon and claims the benefit of priority from prior Japanese Patent Application No. 2012-225168, filed on Oct. 10, 2012, the entire contents of which are incorporated herein by reference.

BACKGROUND ART

The present invention relates to an electronic key registration system that registers an electronic key device to a communication subject.

An electronic key system for a vehicle verifies a key ID transmitted from an electronic key device. Before using the electronic key system, the key ID that is unique to the vehicle key device is registered together with an encryption key to an electronic control unit (ECU) that manages operations of the electronic key system. Japanese Laid-Open Patent Publication Nos. 7-61328, 2003-148018, and 2004-107959 describe examples of electronic key registration systems.

SUMMARY

It is an object of the present invention to provide an electronic key registration system that ensures security for the registration of an electronic key device and increases the accuracy for determining whether or not to permit registration of the electronic key device.

One aspect of the present invention is an electronic key registration system including an electronic key device that stores a key ID, which is unique to the electronic key device, and a first piece of information, which is written in accordance with a notification from outside the electronic key device. A controller is arranged in a communication subject. A registration tool executes a registration operation including writing of the key ID to the controller. The registration tool stores a second piece of information from outside the registration tool. Encrypted communication between the communication subject and the electronic key device is enabled after the key ID and an encryption key corresponding to the key ID is written to the controller. An information center communicates with the registration tool through a communication network. The information center receives the first piece of information, which is stored in the electronic key device, and the second piece of information, which is stored in the registration tool, through the communication network. The information center compares the first piece of information and the second piece of information. The registration tool includes a permission unit that permits execution of the registration operation when receiving a signal from the information center indicating that the first piece of information and the second piece of information conform to each other.

A second aspect of the present invention is a method for registering an electronic key device including a key ID to a communication subject, in which encrypted communication between the communication subject and the electronic key device is enabled after the key ID and an encryption key corresponding to the key ID is written to a controller. The method includes writing a first piece of information to the electronic key device, wherein the first piece of information is provided from a purchaser who places an order for the electronic key device; inputting a second piece of information to a registration tool that is used to write the key ID to the controller by the purchaser of the electronic key device; transmitting the first piece of information stored in the electronic key device and the second piece of information stored in the registration tool through a communication network to an information center to determine whether or not the first and second pieces of information conform to each other; and permitting the registration tool to write the key ID to the controller when receiving a signal from the information center indicating that the first piece of information and the second piece of information conform to each other.

A third aspect of the present invention is an electronic key registration system including an electronic key device storing a key ID unique to the electronic key device; a controller arranged in a communication subject, wherein encrypted communication between the communication subject and the electronic key device is enabled after the key ID and an encryption key corresponding to the key ID is written to the controller; and a registration tool that executes a registration operation including the writing of the key ID to the controller. The electronic key device is configured to store and output a first piece of information provided from a purchaser who places an order for the electronic key device. The registration tool is configured to store a second piece of information provided from the purchaser. The registration tool is configured to transmit the first piece of information of the electronic key device and the second piece of information of the registration tool through a communication network to an information center to determine whether or not the first and second pieces of information conform to each other. The registration tool is configured to be permitted to write the key ID to the controller when a reply from the information center indicates that the first and second pieces of information conform to each other.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of an electronic key registration system will now be described.

Electronic Key System

Figure 1:
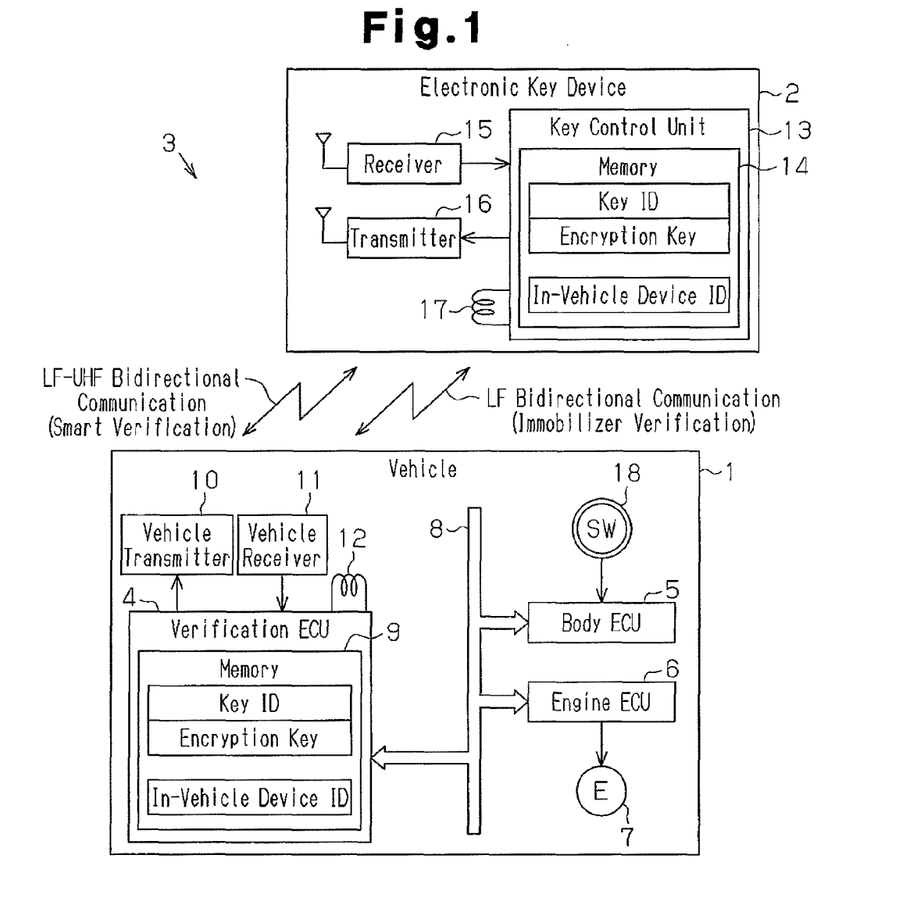
FIG. 1 is a block diagram illustrating one embodiment of an electronic key system.

FIG. 1 illustrates an electronic key system 3 for a vehicle 1. One example of the electronic key system 3 is an operation-free key system. When the operation-free key system is activated by a wireless signal output from the vehicle 1, the operation-free key system verifies the ID (key ID) of an electronic key device 2 (smart verification) through short range communication (communication distance of several meters) performed between the vehicle 1 and the electronic key device 2. Another example of the electronic key system 3 is a near-field communication verification system that verifies the key ID through near-field communication.

The vehicle 1 includes a verification ECU 4, which verifies the ID of the electronic key device 2, a body ECU 5, which manages the power supply for in-vehicle electrical devices, an engine ECU 6, which controls the engine 7, and an in-vehicle bus 8, which connects the ECUs 4 to 6. The verification ECU 4 includes a memory 9 that stores a key verification encryption key, which is used for challenge-response verification during verification, and an in-vehicle device ID, which is unique to the vehicle 1. The set of the key ID and the encryption key are associated with the registered electronic key device. The memory 9 of the verification ECU 4, to which a plurality of electronic key devices are registered, stores multiple sets of a key ID and an encryption key in accordance with the number of electronic key devices. The verification ECU 4 is connected to a vehicle transmitter 10, which transmits radio waves on the low frequency (LF) band, a vehicle receiver 11, which receives radio waves on the ultrahigh frequency (UHF) band, and a communication antenna 12, which is used for bidirectional near-field communication on the LF band.

The electronic key device 2 includes a key control unit 13. The key control unit 13 includes a memory 14 that stores a key ID, an encryption key, and an in-vehicle device ID. The key control unit 13 is connected to a receiver 15, which receives radio waves on the LF band, a transmitter 16, which transmits radio waves on the UHF band, and a communication antenna 17, which is used for near-field communication.

Figure 2:
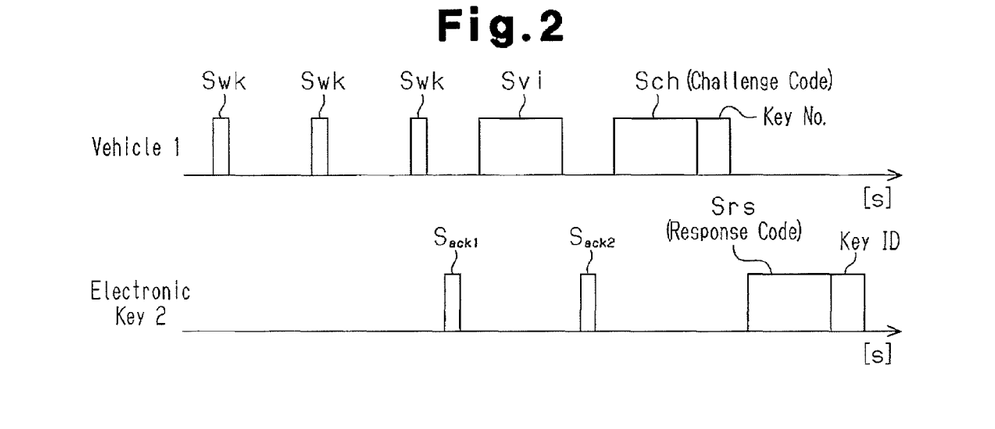
FIG. 2 is a timing chart illustrating wireless signals output from a vehicle and an electronic key device to verify an ID of the electronic key device.

Referring to FIG. 2, when the vehicle 1 is parked and not moving, the vehicle transmitter 10 repetitively transmits wake signals Swk out of the vehicle 1 in controlled intervals. The electronic key device 2, which is activated when receiving a wake signal Swk, transmits an acknowledgement signal Sack1. When the vehicle receiver 11 receives the acknowledgement signal Sack1, the verification ECU 4 transmits an in-vehicle device ID signal Svi and instructs the electronic key device 2 to verify the in-vehicle ID. When the vehicle device ID is verified, the electronic key device 2 transmits an acknowledgement signal Sack2 to the vehicle 1.

The verification ECU 4 transmits a challenge signal Sch, which is used for challenge-response verification, to the electronic key device 2. The challenge signal Sch includes a challenge code, which changes whenever transmitted, and a key number, which indicates the ordinal number as the key registered to the vehicle 1. When receiving the challenge signal Sch, the electronic key device 2 verifies the key number. When the key number is verified, the electronic key device 2 generates a response code by performing a computation with the received challenge code and the encryption key of the electronic key device 2. The electronic key device 2 transmits a response signal Srs to the vehicle 1. The response signal Srs includes the key ID that is unique to the electronic key device 2. When the vehicle receiver 11 receives the response signal Srs, the verification ECU 4 compares a response code, which is computed by the verification ECU 4 in the same manner, with the response code received from the electronic key device 2 (response verification). The verification ECU 4 also verifies the key ID received from the electronic key device 2 (key ID verification). When the response code and the key ID are both verified, the verification ECU 4 determines that smart verification (exterior smart verification) has been accomplished and permits or performs the locking and unlocking of the vehicle doors with the body ECU 5.

Then, when a driver entering the vehicle 1 is detected by a courtesy switch (not illustrated) or the like, the vehicle transmitter 10 starts the transmission of wake signals Swk to the interior of the vehicle 1. When the electronic key device 2 receives the wake signal Swk in the vehicle 1 and accomplishes interior smart verification, the verification ECU 4 permits the shifting of power states of the vehicle and the starting of the engine in accordance with the operation of an engine switch 18.

In the near-field communication verification system, the electronic key device 2 may be operated using power radio waves transmitted from the vehicle 1. Thus, the near-field communication verification allows for the electronic key device 2 to be powered without incorporating a physical power supply. The near-field communication verification may be radio frequency identification (RFID) or near-field communication (NFC). The accomplishment of near-field communication verification in the vehicle 1 permits a power shifting operation (engine starting operation) of the vehicle 1 to be performed when the engine switch 18 is operated.

Electronic Key Registration System

Figure 3:
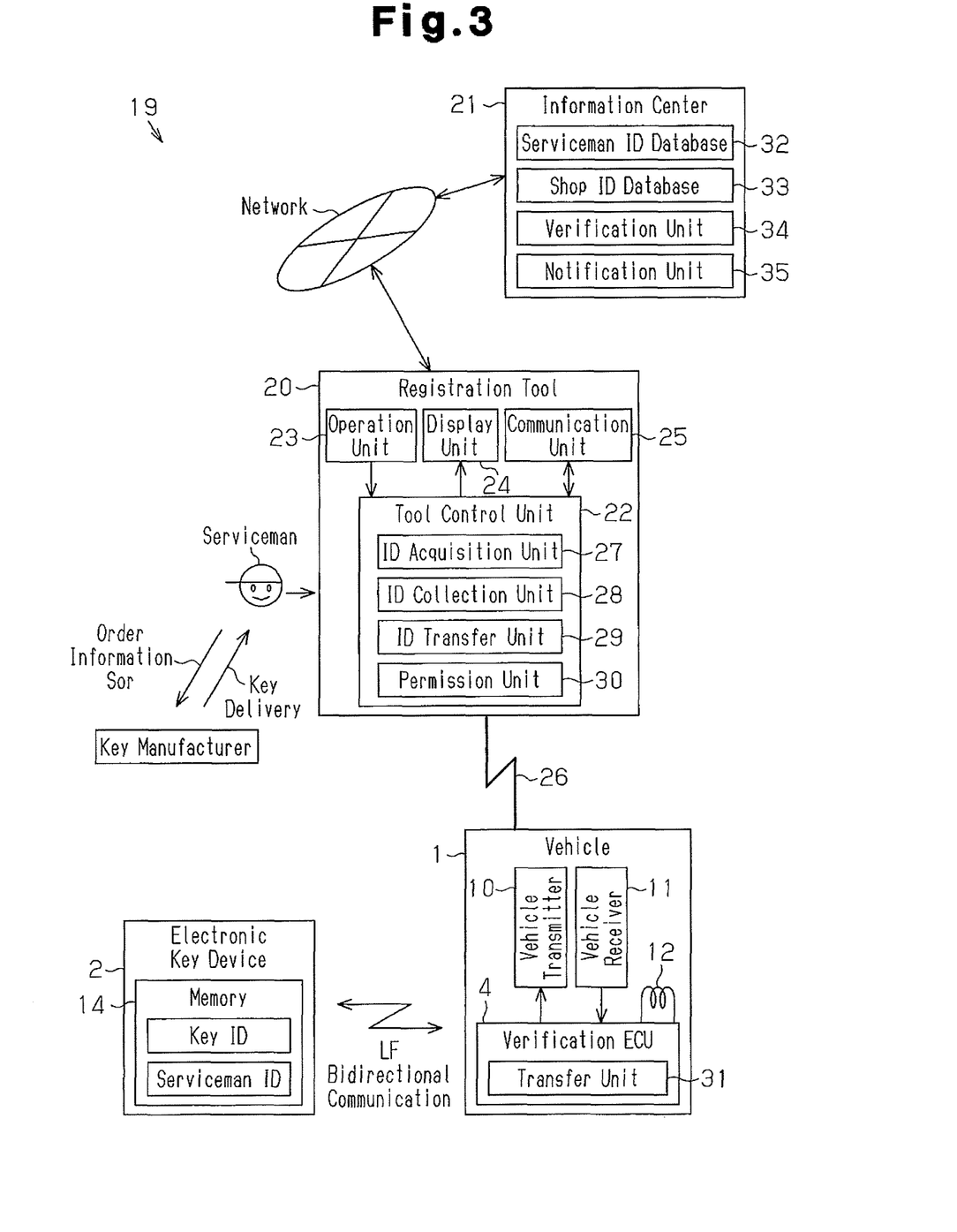
FIG. 3 is a block diagram of the electronic key registration system.

In the example illustrated in FIG. 3, the vehicle 1, the electronic key device 2, a registration tool 20, and an information center 21 configure an electronic key registration system 19. The vehicle 1 includes the verification ECU 4. In the electronic key registration system 19 of the present example, the registration tool 20, which is connected by a network to the information center 21, registers the electronic key device 2 online to the vehicle 1. The electronic key registration system 19 is capable of performing both initiation registration and additional registration. The initial registration registers the electronic key device 2 for the first time to the vehicle 1. The additional registration registers a sub-key to the vehicle 1 to which the electronic key device 2 has already been registered.

The memory 14 of the electronic key device 2 stores a serviceman ID that is unique to the serviceman performing registration tasks on the electronic key device 2. The electronic key device 2 is manufactured in accordance with an order placed by a purchaser such as a serviceman. A key manufacturer writes a key ID, which is unique to the electronic key device 2, and a serviceman ID, which is provided from the purchaser, to the electronic key device 2. Then, the electronic key device 2 is delivered to the serviceman or a store of a dealer to which the serviceman belongs. The serviceman ID is one example of a first piece of information.

The registration tool 20 includes a tool control unit 22, which controls the operation of the registration tool 20, an operation unit 23, which may be an input unit such as a numeric pad, a display unit 24, which includes a screen for showing various messages, and a communication unit 25, which is capable of performing network communication. The network communication may be Internet communication. The registration tool 20 is wire-connected, for example, by a communication cable 26 to the vehicle 1 (verification ECU 4).

The tool control unit 22 includes an ID acquisition unit 27, an ID collection unit 28, an ID transfer unit 29, and a registration permission unit 30. The ID acquisition unit 27 acquires a second piece of information (serviceman ID and/or shop ID) input to the registration tool 20 by the serviceman. The ID collection unit 28 collects the first piece of information (serviceman ID written to the electronic key device 2) and the second piece of information (serviceman ID and/or shop ID manually input to the registration tool 20) when registering an electronic key device. The ID transfer unit 29 transfers the first and second pieces of information collected by the ID collection unit 28 to the information center 21 through network communication. The registration permission unit 30 permits or prohibits the registration of an electronic key device in accordance with a signal received from the information center 21.

The verification ECU 4 includes a serviceman ID transfer unit 31 that receives a request from the registration tool 20, acquires a serviceman ID from the electronic key device 2, and transfers the serviceman ID to the registration tool 20. The serviceman ID transfer unit 31 uses a communication circuit or communication function of the electronic key system 3 to acquire the serviceman ID from the electronic key device 2 and transfer the acquired serviceman ID to the registration tool 20 through the communication cable 26.

The information center 21 includes a serviceman ID database 32, in which authorized serviceman IDs are registered, and a shop ID database 33, in which authorized shop IDs are registered. Preferably, the information center 21 stores the correct corresponding relationships of the serviceman IDs and the shop IDs. In this case, for example, when a serviceman ID associated with a shop in a certain district is used in a shop of another district, the registration of an electronic key is prohibited. Each of the serviceman ID database 32 and the shop ID database 33 is one example of a database.

Further, the information center 21 includes a verification unit 34 and a notification unit 35. The verification unit 34 verifies the first and second pieces of information acquired through network communication from the registration tool 20. The notification unit 35 notifies the verification result to the registration tool 20 through network communication.

The operation of the electronic key registration system 19 of the present example will now be described.

Figure 4:
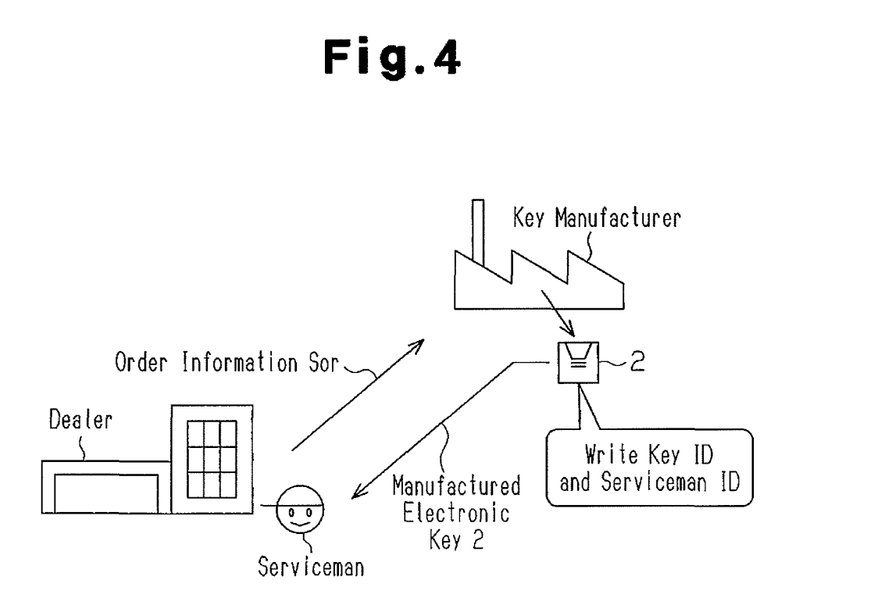
FIG. 4 is a schematic diagram illustrating an order and delivery of the electronic key device and the writing of various IDs to the electronic key device in accordance with the order information.

Referring to FIG. 4, a serviceman places an order to a key manufacturer to have an electronic key device manufactured. The order may be placed using, for example, a telephone, a facsimile, or mail and provides the manufacturer with order information Sor. The order information Sor includes, for example, the serviceman ID, the vehicle type, and the key type. The key manufacturer manufactures an electronic key device 2 based on the order information Sor. The key ID unique to the electronic key device 2 and the serviceman ID included in the order information Sor are written to the memory 14 of the electronic key device 2. The key manufacturer delivers the manufactured electronic key device 2 to the dealer shop or the like. The writing of the serviceman ID and the delivery of the electronic key device are included in a key providing step.

Figure 5:
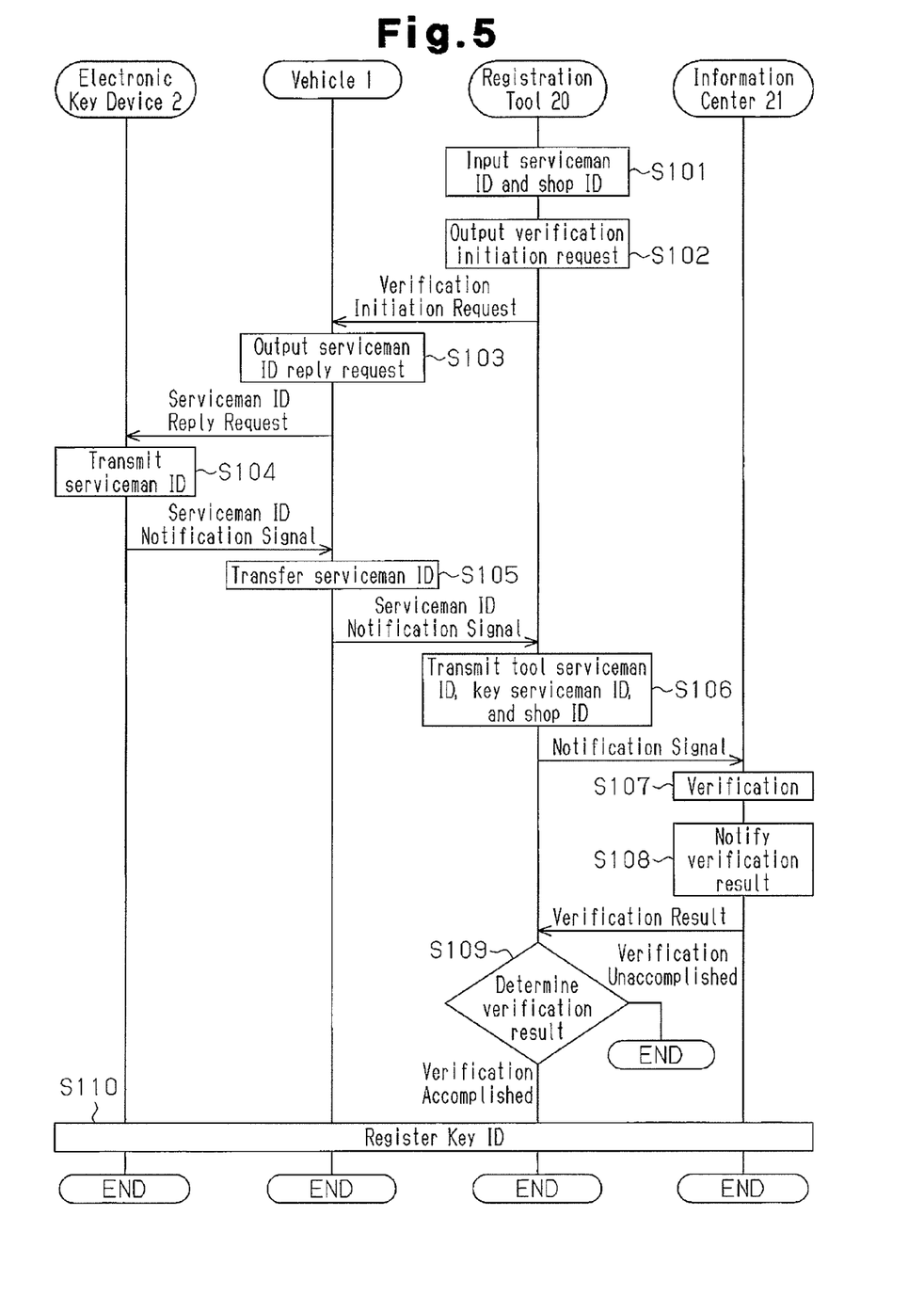
FIG. 5 is a diagram illustrating the registration of the electronic key device.

Then, referring to FIG. 5, in step S101, the serviceman operates the registration tool 20 (operation unit 23) and inputs the serviceman ID and the shop ID to the registration tool 20. The registration tool 20 (ID acquisition unit 27) acquires the input serviceman ID and the shop ID.

When the input of the serviceman ID and the shop ID to the registration tool 20 is completed, in step S102, the ID collection unit 28 sends a verification initiation request to the vehicle 1 through the communication cable 26. In response to the verification initiation request, the verification ECU 4 of the vehicle 1 acquires the serviceman ID written to the electronic key device 2 and initiates verification.

In step S103, in response to the verification initiation request from the registration tool 20, the serviceman ID transfer unit 31 transmits a serviceman ID reply request to the electronic key device 2. For example, the serviceman ID reply request is transmitted from the vehicle 1 to the electronic key device 2 by a communication circuit or communication function of the electronic key system 3 (e.g., communication circuit or communication function of the near-field communication verification system).

In step S104, when the electronic key device 2 receives the serviceman ID reply request from the vehicle 1, the electronic key device 2 reads the serviceman ID from the memory 14 and transmits a serviceman ID notification signal, which includes the serviceman ID, to the vehicle 1. For example, the serviceman ID notification is transmitted to the vehicle 1 by a communication circuit or communication function of the electronic key system 3 (e.g., communication circuit or communication function of the near-field communication verification system).

In step S105, when the serviceman ID transfer unit 31 receives the serviceman ID notification signal within a limited time from when the serviceman ID reply request is transmitted, the serviceman ID transfer unit 31 transfers the serviceman ID notification signal to the registration tool 20 through the communication cable 26.

In step S106, when the ID transfer unit 29 receives the serviceman ID notification signal from the vehicle 1, the ID transfer unit 29 transfers an ID notification signal including the first and second pieces of information to the information center 21 through network communication. The ID notification signal includes the serviceman ID (tool serviceman ID) and the shop ID that are manually input to the registration tool as the second piece of information, the serviceman ID (key serviceman ID) acquired from the electronic key device 2 as the first piece of information, and a command. Steps S101 to S106 configure one example of an ID transmission step.

In step S107, the verification unit 34 of the information center 21 verifies the received first and second pieces of information. In the present example, verification needs to satisfy requirements (i) to (iii), which are shown below.

(i) The tool serviceman ID and the key serviceman ID conform to each other.

(ii) The serviceman ID and the shop ID are registered to the serviceman ID database 32 and the shop ID database 33 in the information center 21.

(iii) The combination of the serviceman ID and the shop ID is correct.

When requirements (i) to (iii) are all satisfied, the verification unit 34 determines that verification has been accomplished. When any one of requirements (i) to (iii) is not satisfied, the verification unit 34 determines that verification has not been accomplished. Step S107 configures one example of a verification step.

In step S108, the notification unit 35 transmits the verification result of the verification unit 34 to the registration tool 20 through network communication. The notification unit 35 may transmit the verification result to the registration tool 20 through wireless communication.

In step S109, the registration permission unit 30 permits or prohibits the registration of the electronic key device 2 in accordance with the verification result received from the information center 21. For example, when a signal received from the information center 21 indicates that verification has been accomplished, registration of the electronic key device 2 is permitted. In this case, in step S110, the electronic key device 2 is registered. When a signal received from the information center 21 indicates that verification has not been accomplished, registration of the electronic key device 2 is prohibited. In this case, processing is forcibly terminated. Steps S108 and S109 configure one example of a registration permission step.

In step S110, the key ID and the encryption key of the electronic key device 2 is written to the memory 9 of the verification ECU 4, and the in-vehicle device ID is written to the memory 14 of the electronic key device 2. In this manner, the electronic key device 2 is registered to the vehicle 1. The key ID, the encryption key, and the in-vehicle ID may be written through any process in step S110. For example, the registration processes proposed by the present application in a previous patent application, such as Japanese Laid-Open Patent Publication No. 2012-108545, may be performed. When the key ID and the encryption key are correctly written to the vehicle 1 and the in-vehicle device ID is correctly written to the electronic key device 2, the registration of the electronic key device 2 is completed.

The present embodiment has the advantages described below.

(1) The electronic key device 2 stores the first piece of information. When the first piece of information stored in the electronic key device 2 and the second piece of information input to the registration tool 20 are verified, the registration of the electronic key device 2 to the vehicle 1 (communication subject) by the registration tool 20 is permitted. The contents of the first piece of information of the electronic key device 2 would be known to a serviceman that operates the registration tool 20 to register the electronic key device 2 but would not be known to another person. Thus, only a serviceman that knows the contents of both of the first piece of information and the second piece of information would be able to register the electronic key device 2 to the vehicle 1 (communication subject). This allows only the authorized serviceman to register the electronic key device 2, and improves security when registering the electronic key device 2. Further, the information center 21 verifies the first piece of information. This improves the verification accuracy.

In one example, when placing an order for the electronic key device 2, the serviceman notifies the key manufacturer of the serviceman ID that is unique to the serviceman. The electronic key manufacturer writes the key ID and the serviceman ID, which has been notified by the serviceman, to the electronic key device 2. The serviceman receives the electronic key device 2, which includes the key ID and the serviceman ID. When the serviceman registers the electronic key device, the registration tool 20 transmits the serviceman ID input to the registration tool 20 and the serviceman ID written to the electronic key device 2 to the information center 21 through a network. The information center 21 verifies the serviceman IDs. When the verification is accomplished, the registration of the electronic key device 2 is permitted. Thus, only the electronic key device 2 ordered by the serviceman can be registered. This improves security when registering the electronic key device 2. Further, since ID verification is performed by the information center 21, the verification accuracy is high.

(2) The information center 21 verifies the serviceman ID assigned to each serviceman. It is difficult for a serviceman to obtain the serviceman ID of another serviceman. This improves security when registering an electronic key device.

(3) The information center 21 verifies the serviceman ID and the shop ID. This improves security when registering an electronic key device.

(4) The serviceman ID acquired from the registration tool 20 is verified by checking whether or not it is registered in the serviceman ID database 32 of the information center 21. Registration is permitted for only an electronic key device of which serviceman ID is registered to the database 32 of the information center 21. This improves security when registering an electronic key device.

(5) The information center 21 determines whether or not the tool serviceman ID and the key serviceman ID conform to each other, whether or not the serviceman ID is registered to the serviceman ID database 32, and whether or not the combination of the serviceman ID and the shop ID is correct. Registration of an electronic key device is permitted only when the three requirements are all satisfied at the same time. This improves security when registering an electronic key device.

(6) The registration tool 20 provides the verification ECU 4 with the verification initiation request, acquires the serviceman ID stored in the electronic key device 2 with the verification ECU 4, and transfers the serviceman ID from the verification ECU 4 to the registration tool 20. The registration tool 20 does not have to include a function for communicating with the electronic key device 2. This simplifies the structure of the registration tool 20.

(7) The registration tool 20 performs network communication with the information center 21. Thus, for example, the vehicle 1 does not need a function for communicating with the information center 21. This simplifies the structure of the vehicle 1.

(8) In one example, the registration of an electronic key device is initiated when a registration initiation operation is performed on the registration tool 20. Thus, the timing for starting registration is clear.

(9) In one example, the ID transmission step uses a network to transmit the first piece of information and the second piece of information to the registration tool 20. Thus, the verification ECU 4 does not need a function for sending a transmission to the information center 21. This simplifies the verification ECU 4.

It should be apparent to those skilled in the art that the present invention may be embodied in many other specific forms without departing from the spirit or scope of the invention. Particularly, it should be understood that the present invention may be embodied in the following forms.

The electronic key system 3 may be changed to another system such as a wireless key system that performs ID verification through short range communication when, for example, communicating with the electronic key device 2.

The verification sequence of the electronic key device 2 may be changed. For example, the electronic key device 2 may simultaneously transmit the in-vehicle device ID, the key number, and the challenge-response code.

The key ID and the encryption key may be shared by the operation-free key system and the near-field communication system.

The vehicle 1 and the electronic key device 2 may be wire-connected for communication during registration of the electronic key device.

During registration of an electronic key device, the vehicle 1 and the electronic key device 2 may communicate with each other through, for example, a communication circuit or communication function of an operation-free key system. Alternatively, communication may be performed through any communication circuit or communication function of a system other than an operation-free key system and a near-field communication system.

Wireless communication may be performed between the vehicle 1 and the registration tool 20.

The transmission of information of the serviceman ID to the information center 21 may be performed by, for example, the vehicle 1 or the electronic key device 2.

The registration tool 20 may provide the electronic key device 2 with an inquiry signal to acquire the key serviceman ID written to the electronic key device 2.

The information center 21 may provide the registration tool 20 with an inquiry signal to acquire a serviceman ID.

Network communication is not limited to Internet communication and may be changed to another type of communication such as a telephone network communication.

The verification in the information center 21 may include verifying the received shop ID with a shop ID database of the information center 21.

The information center 21 may check only at least one of the three requirements described above. As long as the serviceman ID can be verified, the verification performed in the information center 21 may be changed.

The encryption key is not limited to challenge-response verification as long as it is a key used for encrypted communication between two parties.

The verification ECU 4 serves as a controller. However, the controller only needs to be a control unit located at the registration subject of the key ID.

In one example, the first piece of information and the second piece of information may be a string of characters, numbers, and symbols or a combination of characters, numbers, and symbols. In another example, the first piece of information and the second piece of information may be biometric information such as a fingerprint, a voiceprint, or eye color.

The first piece of information and the second piece of information may be just either one of the serviceman ID and the shop ID. As long as the validity of the electronic key device 2 can be ensured, the first piece of information and the second piece of information may use identification information other than the serviceman ID and the shop ID.

As long as a serviceman can obtain the ordered electronic key device 2 that includes the serviceman ID prior to registration, the key manufacturer does not have to directly deliver the electronic key device 2 to the serviceman.

The key providing step may be performed, for example, automatically under the control of the information center 21.

The registration tool 20 may be incorporated in the vehicle 1.

The communication subject is not limited to the vehicle 1 and may be a device or instrument other than the vehicle 1.

The present examples and embodiments are to be considered as illustrative and not restrictive, and the invention is not to be limited to the details given herein, but may be modified within the scope and equivalence of the appended claims.

The invention claimed is:

1. An electronic key registration system comprising:
an electronic key device that stores a key ID, which is unique to the electronic key device, and a first serviceman ID as a first piece of information, which is written, by a key manufacturer in accordance with an order from a purchaser of the electronic key device to the key manufacturer to have the electronic key device manufactured, and the order includes the first piece of information;
a controller arranged in a communication subject;
a registration tool that executes a registration operation including writing of the key ID to the controller, wherein encrypted communication between the communication subject and the electronic key device is enabled after the key ID and an encryption key corresponding to the key ID is written to the controller; and
an information center that communicates with the registration tool through a communication network, wherein the registration tool includes an input and a transmitter, and is configured to:
acquire a second serviceman ID as a second piece of information through a manual operation to the input of the registration tool by a serviceman who operates the registration tool to perform a task for registering the electronic key device to the controller of the communication subject,
collect, from the electronic key device, the first serviceman ID as the first piece of information stored in the electronic key device,
when the registration tool acquires the second serviceman ID as the second piece of information through the manual operation to the input and collects the first serviceman ID as the first piece of information from the electronic key device, send from the transmitter to the information center, through the communication network, the first serviceman ID as the first piece of information collected from the electronic key device, the second serviceman ID as the second piece of information acquired through the manual operation to the input of the registration tool, and a command to verify the second serviceman ID,
the information center receives the command to verify and compares the first piece of information and the second piece of information, and
the registration tool includes a processor configured to permit execution of the registration operation when the registration tool receives a signal from the information center indicating that the first piece of information and the second piece of information conform to each other.

2. The electronic key registration system according to claim 1, wherein the first piece of information further includes a shop ID that is unique to a shop to which the serviceman belongs.

3. The electronic key registration system according to claim 1, wherein
the information center includes a database, and
the information center checks whether or not the first piece of information and the second piece of information conform to each other and whether or not the first piece of information has been registered in advance to the database.

4. The electronic key registration system according to claim 1, wherein
the first piece of information and the second piece of information each further include a shop ID, which is unique to a shop to which the serviceman belongs, and
the registration tool is configured to write the key ID to the controller when receiving a signal from the information center indicating that the first and second pieces of information conform to each other and that the first serviceman ID and the shop ID have been registered in advance to the database as the first piece of information.

5. The electronic key registration system according to claim 1, wherein
the controller is configured to acquire the first piece of information from the electronic key device in response to a request from the registration tool,
the controller is configured to transmit the acquired first piece of information to the registration tool, and
the registration tool is configured to receive the first piece of information from the controller and to transmit the first piece of information to the information center.

6. The system according to claim 1, wherein the registration tool is configured to request for the first serviceman ID as the first piece of information from the electronic key device when the input of the second serviceman ID as the second piece of information to the registration tool is completed.

7. The system according to claim 1, wherein the registration tool is configured to send an ID notification signal including the first piece of information, the second piece of information, and the command.

8. A method for registering an electronic key device including a key ID to a communication subject, wherein encrypted communication between the communication subject and the electronic key device is enabled after the key ID and an encryption key corresponding to the key ID is written to a controller of the communication subject, the method comprising:
sending an order from a purchaser of the electronic key device to a key manufacturer to have the electronic key device manufactured, the order including a first serviceman ID as a first piece of information;
writing, by the key manufacturer, the first serviceman ID as the first piece of information to the electronic key device included in the order from the purchaser;
delivering the electronic key device that stores the first serviceman ID as the first piece of information from the key manufacturer to the purchaser;
inputting a second serviceman ID as a second piece of information though a manual operation to an input of a registration tool by a serviceman who operates the registration tool to perform a task for registering the electronic key device;
transmitting, by a transmitter of the registration tool, the first serviceman ID as the first piece of information collected from the electronic key device, the second serviceman ID as the second piece of information acquired through the manual operation to the input of the registration tool, and a command to verify through a communication network to an information center to determine whether or not the first and second pieces of information conform to each other; and
permitting the registration tool to write the key ID to the controller when the registration tool receives a signal from the information center indicating that the first piece of information and the second piece of information conform to each other.

9. The method according to claim 8, further comprising determining whether or not the first and second pieces of information received by the information center have been registered in advance in the information center,
wherein when the signal from the information center indicates that the first and second pieces of information conform to each other and that the first and second pieces of information are also registered in advance to the information center, the registration tool is permitted to write the key ID to the controller.

10. An electronic key registration system comprising:
an electronic key device storing a key ID unique to the electronic key device and a first serviceman ID as a first piece of information, which is written in accordance with an order from a purchaser of the electronic key device to a key manufacturer to have the electronic key device manufactured, and the order includes the first piece of information;
a controller arranged in a communication subject, wherein encrypted communication between the communication subject and the electronic key device is enabled after the key ID and an encryption key corresponding to the key ID is written to the controller;
a registration tool that executes a registration operation including the writing of the key ID to the controller, wherein
the electronic key device is configured to store the first serviceman ID as the first piece of information, which is written by the key manufacturer in accordance with the order from the purchaser of the electronic key device to the key manufacturer to have the electronic key device manufactured, the order including the first piece of information,
the registration tool includes an input and is configured to acquire a second serviceman ID as a second piece of information through a manual operation to the input by a serviceman who operates the registration tool to perform a task for registering the electronic key device to the controller of the communication subject,
the registration tool includes a transmitter configured to, when the registration tool acquires the second serviceman ID as the second piece of information through the manual operation to the input and collects the first serviceman ID as the first piece of information from the electronic key device, transmit the first piece of information of the electronic key device, the second piece of information of the registration tool, and a command to verify through a communication network to an information center to determine whether or not the first and second pieces of information conform to each other, and
the registration tool is configured to be permitted to write the key ID to the controller when the registration tool receives a reply from the information center indicating that the first and second pieces of information conform to each other.

11. The system according to claim 10, wherein when the reply from the information center indicates that the first and second pieces of information conform to each other and that the first and second pieces of information are also registered in advance to the information center, the registration tool is permitted to write the key ID to the controller.

* * * * *

UNITED STATES PATENT AND TRADEMARK OFFICE
CERTIFICATE OF CORRECTION

PATENT NO. : 9,509,496 B2  
APPLICATION NO. : 14/044347  
DATED : November 29, 2016  
INVENTOR(S) : Kawamura et al.

Page 1 of 1

It is certified that error appears in the above-identified patent and that said Letters Patent is hereby corrected as shown below:

In the Claims

Column 11, Line 36 (Claim 8) please change "information to" to -- information, to --

Signed and Sealed this
Ninth Day of May, 2017

Michelle K. Lee
*Director of the United States Patent and Trademark Office*